United States Patent
Yamada et al.

(10) Patent No.: US 8,200,360 B2
(45) Date of Patent: Jun. 12, 2012

(54) MACHINING PARAMETER OPTIMIZING APPARATUS, METHOD FOR OPTIMIZING MACHINING PARAMETER AND PROGRAM THEREFOR

(75) Inventors: Yoshihiko Yamada, Anjo (JP);
Toshiyuki Okita, Nishio (JP);
Yoshimasa Kuwano, Aichi-gun (JP)

(73) Assignee: JTEKT Corporation, Osaka-shi (JP)

( * ) Notice: Subject to any disclaimer, the term of this patent is extended or adjusted under 35 U.S.C. 154(b) by 367 days.

(21) Appl. No.: 12/511,716

(22) Filed: Jul. 29, 2009

(65) Prior Publication Data
US 2010/0036519 A1 Feb. 11, 2010

(30) Foreign Application Priority Data
Aug. 6, 2008 (JP) .................. 2008-202646

(51) Int. Cl.
*G06F 19/00* (2011.01)
*G06F 7/48* (2006.01)
(52) U.S. Cl. .............. 700/177; 700/178; 703/7
(58) Field of Classification Search .......... 700/159, 700/177–179, 182; 703/7
See application file for complete search history.

(56) References Cited

U.S. PATENT DOCUMENTS

| 4,513,366 | A * | 4/1985 | Munekata et al. ........... 700/178 |
| 5,122,966 | A * | 6/1992 | Jansen et al. ................ 700/178 |
| 5,150,305 | A * | 9/1992 | Sekikawa ..................... 700/184 |
| 5,416,715 | A * | 5/1995 | Kinoshita et al. ............ 700/178 |
| 6,157,869 | A * | 12/2000 | Matsumura et al. ......... 700/178 |
| 6,438,445 | B1 * | 8/2002 | Yoshida et al. .............. 700/173 |
| 7,251,543 | B2 * | 7/2007 | Nakamura ................... 700/178 |
| 7,689,300 | B2 * | 3/2010 | Naganawa et al. ............ 700/61 |
| 7,979,254 | B2 * | 7/2011 | Ohashi et al. ................... 703/7 |
| 8,126,585 | B2 * | 2/2012 | Yamaguchi ................. 700/178 |
| 2002/0073812 | A1 * | 6/2002 | Yamazaki et al. ............ 82/118 |
| 2005/0055134 | A1 * | 3/2005 | Okuda et al. ................ 700/245 |

(Continued)

FOREIGN PATENT DOCUMENTS

EP 1 168 128 A1 1/2002
JP 2006-244067 9/2006

OTHER PUBLICATIONS

Extended Search Report issued Sep. 2, 2011 in European Patent Application No. 09166624.8-2206/2154589.

(Continued)

*Primary Examiner* — Ronald Hartman, Jr.
(74) *Attorney, Agent, or Firm* — Oblon, Spivak, McClelland, Maier & Neustadt, L.L.P.

(57) ABSTRACT

It is an object of the present invention to provide a machining parameter optimizing apparatus deciding a tool axis attitude and a machining zone and deciding a tooling having high stiffness for any profile of a finished workpiece. A tool axis attitude deciding member 21 decides one or plural tool axis attitude. An interference dangerous zone deciding member 23 decides as an interference dangerous zone a zone possible to interfere between a tool or a tool holder and a workpiece during machining by the decided tool axis attitude. A machining simulation member 25 executes a machining simulation based on the interference dangerous zone by the decided tool axis attitude and generates the virtual tool holder in which there is no any interference, and also decides a machining zone in a way of avoiding the interference dangerous zone. A non-interference tooling deciding member 27 deciding the tooling included in a range of a profile of the virtual tool holder, the tooling is a combination of the tool and the tool holder having the highest stiffness.

14 Claims, 12 Drawing Sheets

U.S. PATENT DOCUMENTS

| | | | |
|---|---|---|---|
| 2005/0283270 A1* | 12/2005 | Nakamura | 700/178 |
| 2006/0041325 A1* | 2/2006 | Naganawa et al. | 700/61 |
| 2006/0058906 A1* | 3/2006 | Ohashi et al. | 700/182 |
| 2008/0086221 A1* | 4/2008 | Ogawa | 700/17 |
| 2009/0265030 A1* | 10/2009 | Huang et al. | 700/182 |
| 2011/0035044 A1* | 2/2011 | Takahashi et al. | 700/178 |

OTHER PUBLICATIONS

Tao Ye, et al., "Geometric Parameter Optimization in Multi-Axis Machining", Computer-Aided Design, XP023981221, vol. 40, No. 8, Aug. 1, 2008, pp. 879-890.

U.S. Appl. No. 12/820,321, filed Jun. 22, 2010, Okita, et al.

* cited by examiner

MACHINING PARAMETER OPTIMIZING APPARATUS, METHOD FOR OPTIMIZING MACHINING PARAMETER AND PROGRAM THEREFOR

INCORPORATION BY REFERENCE

The present application claims priority under 35 U.S.C. §119 to Japanese Patent Applications No. 2008-202646, filed on Aug. 6, 2008. The content of this application is incorporated herein by reference in their entirety.

BACKGROUND OF THE INVENTION

1. Field of the Invention

The present invention relates to an analysis machining a die or a metal mold etc., especially a machining parameter optimizing apparatus, a method for optimizing the machining parameter and a program therefor to optimize the machining parameter relating to a tool axis attitude, a machining zone, a tooling and so on.

2. Description of the Related Art

In conventional method, an operator for CAM (Computer Aided Manufacturing) sets the tool axis attitude, the tooling and the machining zone where a tool and a tool holder do not interfere or do seldom interfere with a finished workpiece by relying on his or her experience or instinct. The tool axis attitude, the tooling, the machining zone and so on to generate a machining data are defined as the machining parameter. The CAM decides a tool path according to the set machining parameter and generates the machining data. The generated machining data is verified by a NC (Numerical Control) simulator if there is any interference. Where there is some interference, the CAM operator repeats to change and set the tool axis attitude, the tooling, the machining zone and so on in relying on his or her experience or instinct.

The method relied on the experience or instinct can be performed by only skilled CAM operator. However, one of the inventors invents a system deciding the machining process in a three-axis machining as disclosed in Japanese laid-open patent publication 11-235646. And also, it is disclosed a system deciding a optimizing tooling in three-axis machining as disclosed in Japanese laid-open patent publication 09-179620. It is also disclosed in Japanese laid-open patent publication 2007-172300 a method supporting a thinking operation by the CAM operator by deciding automatically the tool axis attitude without interference and suitable for an assigned tooling after the machining zone is limited to an identified portion.

However, the conventional operating method relied on person's thinking has high possibility of danger in which the set tooling interferes with the finished workpiece profile, therefore, it needs to verify the interference by a NC simulator prior to an actual machining as explained above. If there exists any interference, the operator must go back to the first step again so that it forces more extra works to the operator. In order to reduce the repeating operation the operator tends to select a tool having longer projecting length, thereby to reduce stiffness of the tooling so that high efficient machining is not achieved.

In the system deciding the machining process disclosed in the above-identified first Japanese patent publication and the system deciding the tooling disclosed in the above-identified second Japanese patent publication, the tool having longer projecting length should be selected for the finished workpiece having a deep standing wall with which the tool is easy to make the interference, thereby to reduce stiffness of the tooling so that high efficient machining is not achieved.

In the system disclosed in the above-identified third Japanese patent publication, it is impossible to decide automatically the tooling having the highest stiffness within no interference with the finished workpiece because the tooling must be set as an initial value. And the system disclosed in the above-identified third Japanese patent publication is the system detecting the interference with the finished workpiece so that the system can not detect the interference with an unfinished workpiece, especially the interference in a rough machining where difference between the finished workpiece profile and the unfinished workpiece profile.

SUMMARY OF THE INVENTION

In view of the previously mentioned circumstances, it is an object of the present invention to provide a machining parameter optimizing apparatus deciding a tool axis attitude and a machining zone and deciding a tooling having high stiffness for any profile of a finished workpiece.

It is second object of the present invention to provide a method for optimizing a machining parameter to decide a tool axis attitude and a machining zone and to decide a tooling having high stiffness for any profile of a finished workpiece.

It is third object of the present invention to provide a program functioning a computer as a machining parameter optimizing apparatus deciding a tool axis attitude and a machining zone and deciding a tooling having high stiffness for any profile of a finished workpiece.

In order to achieve the above and other objects, one aspect of the present invention provides a machining parameter optimizing apparatus optimizing a machining parameter relating to at least a tool axis attitude, a machining zone and a tooling comprising a tool axis attitude deciding member deciding one or plural tool axis attitude, an interference dangerous zone deciding member deciding as an interference dangerous zone a zone possible to interfere between a tool or a tool holder and a workpiece during machining by the decided tool axis attitude, a virtual tool holder generating member executing a machining simulation based on the interference dangerous zone by the decided tool axis attitude and deciding the machining zone in a way of avoiding the interference dangerous zone to generate the virtual tool holder in which there is no any interference; and a tooling deciding member deciding the tooling included in a range of a profile of the virtual tool holder, the tooling is a combination of the tool and the tool holder having the highest stiffness. Thereby, it is possible to decide the tool axis attitude and the machining zone and to decide the tooling having high stiffness for any profile of the finished workpiece.

The interference dangerous zone deciding member according to the first aspect of the present invention identifies a zone possible to interfere in machining by moving an interference template generated based on the identified tool and the tool holder along a profile of the finished workpiece. The predetermined tool holder and the tool are selected larger size than that possible to be used in an actual machining, thereby it can reduce the possibility of any interference to nearly zero.

The tooling deciding member according to the first aspect of the present invention decides the tooling every tool axis attitude decided by the tool axis attitude deciding member. The tooling is decided every tool axis attitude, thereby it can machine the workpiece in optimized tooling for each tool axis attitude.

The machining parameter optimizing apparatus according to the first aspect of the present invention further comprises a remaining machining zone extracting member generating a workpiece profile machined in accordance with the decided tool axis attitude, the decided machining zone and the decided tooling or a predetermined tooling to extract as a remaining machining zone a difference between the generated workpiece profile and a finished workpiece.

The tooling deciding member according to the first aspect of the present invention decides the tooling executed over a predetermined process based on the virtual tool holder generated finally by the virtual tool holder generating member after repeating processes by the tool axis attitude deciding member, the interference dangerous zone deciding member, the virtual tool holder generating member and the remaining machining zone extracting member until the remaining machining zone is zero. Thereby, there is no need to change any tools in a predetermined process to increase a machining efficiency.

Second aspect of the present invention provides a method for optimizing a machining parameter relating to at least a tool axis attitude, a machining zone and a tooling comprising a tool axis attitude deciding step deciding one or plural tool axis attitude, an interference dangerous zone deciding step deciding as an interference dangerous zone a zone possible to interfere between a tool or a tool holder and a workpiece during machining by the decided tool axis attitude, a virtual tool holder generating step executing a machining simulation based on the interference dangerous zone by the decided tool axis attitude and deciding the machining zone in a way of avoiding the interference dangerous zone to generate the virtual tool holder in which there is no any interference, and a tooling deciding step deciding the tooling included in a range of a profile of the virtual tool holder, the tooling is a combination of the tool and the tool holder having the highest stiffness. By using a computer realizing the method for optimizing the machining parameter according to the second aspect of the present invention, it is possible to decide the tool axis attitude and the machining zone and to decide the tooling having high stiffness for any profile of the finished workpiece.

Third aspect of the present invention provides a program functioning a computer as the machining parameter optimizing apparatus according to first aspect of the present invention.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Figure 1:
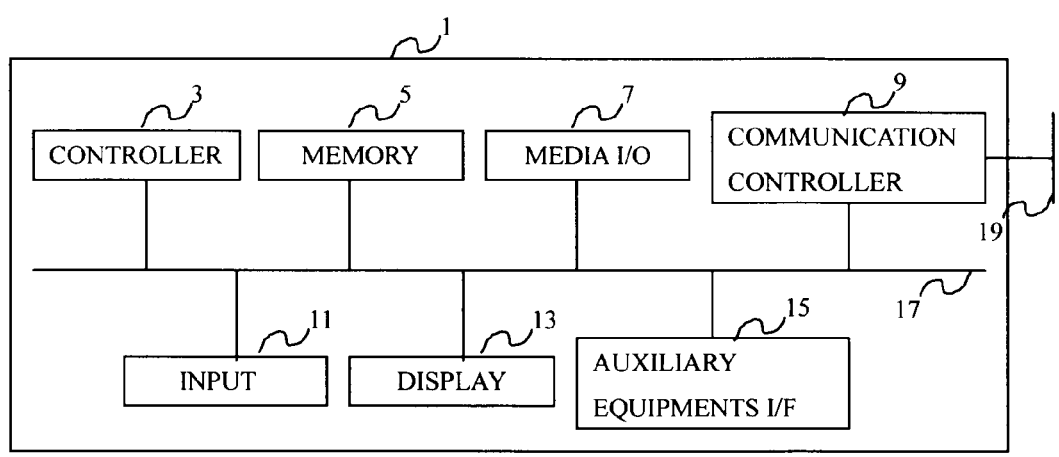
FIG. 1 is a diagram showing hardware of a computer of the machining parameter optimizing apparatus 1 according to the one embodiment of the present invention.

A preferred embodiment of the machining parameter optimizing apparatus, method of optimizing the machining parameter and the program therefor according to the present invention will be described referring to FIG. 1 to FIG. 12. FIG. 1 shows a construction of hardware of a computer realizing a machining parameter optimizing apparatus 1 according to one embodiment of the present invention. Besides, it is possible for an ordinary skilled in the art to construct various other constructions based on applications and purposes than the hardware construction shown in FIG. 1.

In the machining parameter optimizing apparatus 1 are respectively connected a controller 3, a memory 5, a media I/O (input/output) 7, a communication controller 9, an input 11, a display 13, an auxiliary equipments I/F (inter face) 15 and so on through a bus 17.

The controller 3 is constructed with a CPU (Central Processing Unit), a ROM (Read Only Memory), a RAM (Random Access Memory) etc.

The CPU reads out and executes programs stored in the memory 5, the ROM and the other recording medium and controls each of devices 7-15 connected through the bus 17 in order to realize an operation of the machining parameter optimizing apparatus 1.

The ROM is a nonvolatile memory to store permanently a boot program, programs for a BIOS (Basic Input/Output System) etc. datum, and so on.

The RAM is a volatile memory to store temporally programs, datum, etc. loaded from the memory 5, the ROM and the other recording medium as well as to provide a working area where the controller 3 executes various processes.

The memory 5 is a HDD (Hard Disk Drive) where programs executed by the controller 3, datum needed for executing the programs, an OS (Operating System) are stored. About the programs, a control program relating to the OS and an application program being executed by the computer described hereinafter and so on are stored in the memory 5.

Codes of each program are read out from the controller 3 according to its needs to be transferred to the RAM, thereafter to be read out by the CPU to be executed as means for various operations.

The media I/O 7 executes to input and output datum and includes media I/O devices such as a CD drive, a DVD drive, a MO drive etc.

The communication controller 9 includes a communication controlling device, a communication port etc. and is a communication interface to handle any communication between other computer and a network 19 to make a data communication through the network 19 to the other computer.

The input 11 executes a data input and includes an input device such as a ten-key, a pointing device like a keyboard, a mouse and so on in order to execute any operating order, motion order, data input etc to the computer through the input 11.

The display 13 includes a displaying device such as a CRT monitor, a crystalline liquid panel etc., a logical circuit realizing video function of the computer in conjunction with the displaying device, and so on.

The auxiliary equipments I/F 15 is a port to connect auxiliary equipments to the computer and therefore the computer can transmit and receive signals through the auxiliary equipments I/F 15 to and from the auxiliary equipments. The auxiliary equipments I/F 15 is constructed with USB, IEEE1394, RS-232C and so on and includes a plurality of auxiliary equipments I/F. A connecting media is not limited to a wire type or a wireless type.

The buss 17 is a line to carry control signals, data signals, etc. to be transmitted and received by each of the devices.

Figure 2:
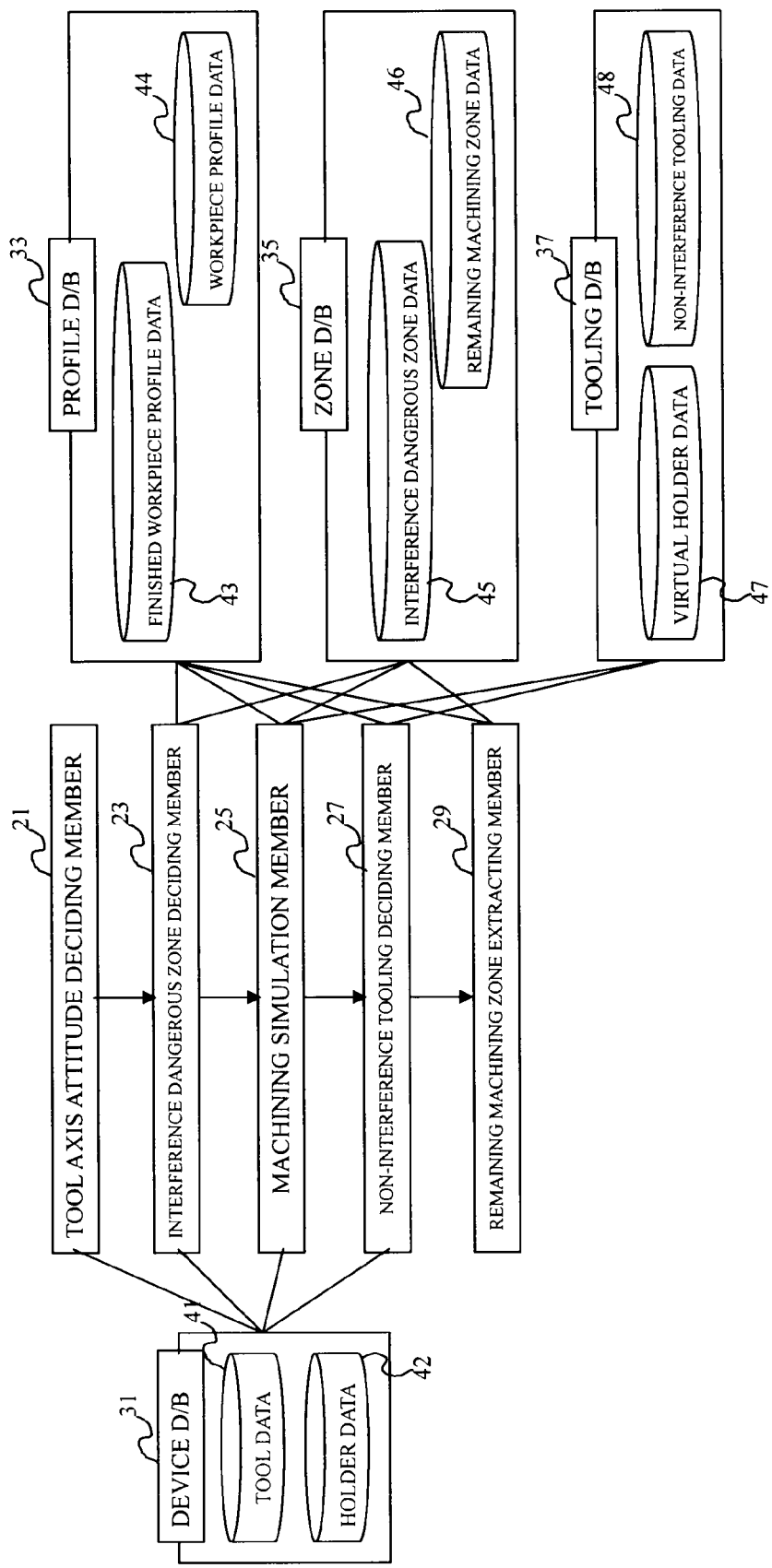
FIG. 2 is an explanatory diagram to show an outline construction of the machining parameter optimizing apparatus 1.

An outline of functions of the machining parameter optimizing apparatus 1 will be explained hereinafter referred to FIG. 2. FIG. 2 shows an outline construction of the machining parameter optimizing apparatus 1.

The machining parameter optimizing apparatus 1 includes a tool axis attitude deciding member 21, an interference dangerous zone deciding member 23, a machining simulation member 25, a non-interference tooling deciding member 27, a remaining machining zone extracting member 29, a device data base (D/B) 31, a profile data base (D/B) 33, a zone data base (D/B) 35, a tooling data base (D/B) 37, and so on. The machining parameter optimizing apparatus 1 optimizes a machining parameter relating to a tool axis attitude, a machining zone and a tooling by means of function of these members.

The tool axis attitude deciding member 21 is to decide a tool attitude of one or plural tools. One embodiment of the present invention is prepared for, for example for a machining by a numerical control machine tool to be able to change the tool attitude as a five-axis controlled machine tool. The tool axis attitude deciding member 21 may be an interface with which an operator identifies the attitude of the tool axis through the input 11 etc., or may be a device by which the machining parameter optimizing apparatus 1 decides automatically a plurality of tool axis attitudes suitable for the machining based on information of a finished workpiece profile etc. One example of the tool axis attitude deciding member 21 will be described in FIG. 3 hereinafter.

The interference dangerous zone deciding member 23 decides as an interference dangerous zone any zone possible to interfere between a tool holder or a tool and the workpiece in machining. The interference dangerous zone deciding member 23 identifies the possible interference dangerous zone where the tool holder or the tool interferes with the workpiece in machining by the way that it moves along the finished workpiece figure an interference template generated on a basis of the predetermined tool holder and tool. The interference dangerous zone deciding member 23 will be described in detail referred to FIG. 4 to FIG. 7 hereinafter.

The machining simulation member 25 executes a machining simulation at each of the decided tool axis attitudes on a basis of the decided interference dangerous zone in order to decide a safety machining zone in a way of avoiding the possible interference dangerous zone, thereby deciding a virtual tool holder which can not interfere with the workpiece. The machining simulation member 25 will be described in detail referred to FIG. 8 and FIG. 9 hereinafter.

The non-interference tooling deciding member 27 decides a tooling including a combination of the tool and the tool holder having the highest stiffness and being included in a range of the profile of the virtual tool holder. The non-interference tooling deciding member 27 will be described in detail referred to FIG. 10 and FIG. 11 hereinafter.

The remaining machining zone extracting member 29 generates a machined workpiece profile machined in accordance with the decided tool axis attitude, the decided machining zone and the decided tooling or a predetermined tooling to define a remaining zone after machining where is a difference from the generated workpiece profile to the finished workpiece profile, thereby extracting the difference as the remaining zone after machining.

The device data base 31 stores a tool data 41, a tool holder data 42 etc. The tool data 41 includes information of a tool dimension etc. and is registered previously. The tool dimension is for examples a tool diameter, a tool length, etc. The tool holder data 42 includes information of a tool holder dimension etc. and is registered previously. The tool holder dimension is for examples a tool holder diameter etc.

The profile data base 33 stores a finished workpiece profile data 43, a workpiece profile data 44 and so on. The finished workpiece profile data 43 includes information of a die or metal mold profile as the finished workpiece etc. and is registered previously. The workpiece profile data 44 is registered as a result processed by the machining simulation member 25.

The zone data base 35 stores an interference dangerous zone data 45, a remaining machining zone data 46 etc. The interference dangerous zone data 45 includes information of the zone where there is a possibility of the interference during machining and is registered as a result processed by the interference dangerous zone deciding member 23. The remaining machining zone data 46 is registered as a result processed by the remaining machining zone extracting member 29.

The tooling data base 37 stores a virtual tool holder data 47, a non-interference tooling data 48 etc. The virtual tool holder data 47 is registered as an initial value generated on a basis of the predetermined workpiece and the predetermined tool holder, and also registered as a result processed by the machining simulation member 25.

Referred to FIG. 3 to FIG. 11, it will be explained in detail the tool axis attitude deciding member 21, the interference dangerous zone deciding member 23, the machining simulation member 25 and the non-interference tooling deciding member 27. The beginning in an explanation of each of members has an index such as [tool axis attitude deciding member 21]. Besides, FIG. 3 to FIG. 11 show the finished workpiece profile, the tool, the tool holder etc. in a way of two dimension, however these finished workpiece profile, tool, tool holder etc. should be three dimensional profiles. These drawings show images projected on a predetermined plane from their three dimensional profiles, therefore in actual these images are three dimensional curved surfaces.

[The Tool Axis Attitude Deciding Member 21]

Figure 3:
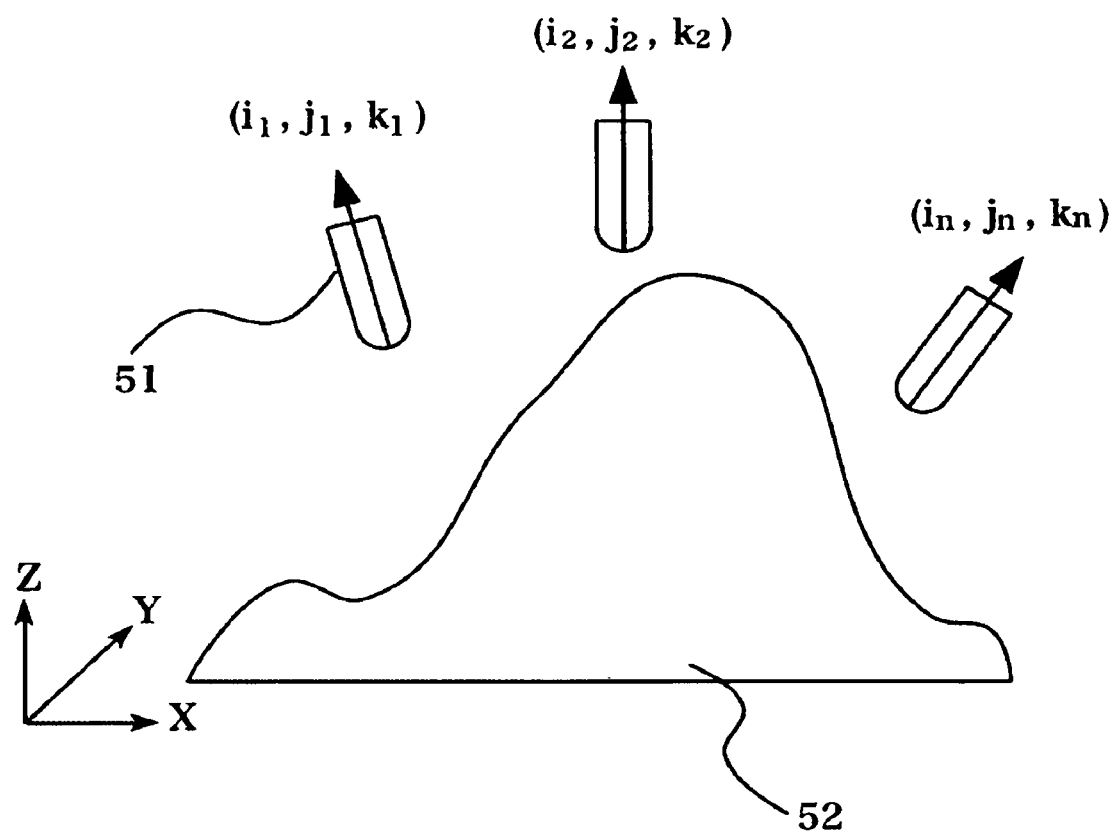
FIG. 3 is an explanatory diagram for setting the tool axis attitude.

Referred to FIG. 3, the tool axis attitude deciding member 21 will be explained in detail here. FIG. 3 is an explanatory diagram for setting the tool axis attitude. As shown in FIG. 3, the tool axis attitude deciding member 21 set a plurality of tool axis attitudes $(i_1, j_1, k_1)$, $(i_2, j_2, k_2)$ to $(i_n, j_n, k_n)$.

It will be explained hereunder a process of deciding the tool axis attitude by using a scalar product of a normal direction of a micro triangle plane and the tool axis attitude where one example of the tool axis attitude deciding member 21 is a model in which a surface of the finished workpiece profile is constructed with a plurality of the micro triangle planes.

In Step 1, the controller 3 defines a direction cosine $T(i, j, k)$ indicating the tool axis attitude. In specific, the controller 3 defines $i = \sin \beta \times \sin \alpha$, $j = \sin \beta \times \cos \alpha$, $k = \cos \beta$ where are 0 degree $\leq \alpha \leq 360$ degrees and 0 degree $\leq \beta \leq 90$ degrees. The controller 3 changes contents of α and β every five degrees step by step to define a group of the dispersed direction cosine (T(i, j, k) where α=0, 5, 10 to 360 degrees and β=0, 5, 10 to 90 degrees). The tool attitude in α, β is defined as Tαβ.

In Step 2, the controller 3 represents all surfaces of the finished workpiece profile by a polyhedron of the plural micro triangle planes. Each of the plural micro triangle planes is defined as a triangle vector Vi having its direction coinciding with a normal direction to the micro triangle plane and its length being a vector with an area of the micro triangle plane.

In Step 3, the controller 3 calculates the scalar product Tαβ×Vi multiplying the tool axis attitude Tαβ with the triangle vector Vi and adds the calculated value of the scalar product to a scalar product deciding value N(1)αβ if the calculated value is +(plus). This process is executed every tool axis attitude Tαβ over the whole of the finished workpiece profile, that is to say every triangle vector Vi. Therefore, the scalar product deciding value N(1)αβ is a summed value of the scalar product Tαβ×Vi every tool axis attitude Tαβ where the value is plus.

In Step 4, the controller 3 executes the Step 3 at all tool axis attitudes Tαβ to calculate the scalar product deciding value N(1)αβ every tool axis attitude.

In Step 5, the controller 3 aligns the tool axis attitude Tαβ in descending order of the scalar product deciding value N(1)αβ to establish a rank order of the tool axis attitude Tαβ.

In Step 6, the controller 3 decides as the first tool axis attitude the maximum tool axis attitude Tαβ where the scalar product deciding value N(1)αβ is maximum.

In Step 7, the controller 3 calculates the scalar product Tαβ×Vi multiplying the tool axis attitude Tαβ with the triangle vector Vi in relation to the tool axis attitude Tαβ except for T1. The controller 3 adds the calculated value to the scalar product deciding value N(2)Nαβ if the condition of Tαβ× Vi>T1×Vi is satisfied. This process is executed every tool axis attitude Tαβ over the whole of the finished workpiece profile, that is to say every triangle vector Vi. Therefore, the scalar product deciding value N(2)αβ is a summed value of the scalar product Tαβ×Vi every tool axis attitude Tαβ where the condition of Tαβ×Vi>T1×Vi is satisfied.

In Step 8, the controller 3 executes the Step 7 every each of the all tool axis attitude Tαβ except for T1 to calculate the scalar product deciding value N(2)αβ every tool axis attitude.

In Step 9, the controller 3 aligns the tool axis attitude Tαβ in descending order of the scalar product deciding value N(2)αβ to establish the rank order of the tool axis attitude Tαβ.

In Step 10, the controller 3 decides as the second tool axis attitude the maximum tool axis attitude Tαβ where the scalar product deciding value N(2)αβ is maximum.

In Step 11, the controller 3 continues to decide the tool axis attitude T3, T4 to Tn until there is no scalar product Tαβ satisfying the condition of Tαβ×Vi>Tn×Vi where n is a number of the tool axis attitude decided by the controller 3. When there is no scalar product Tαβ satisfying the condition of Tαβ×Vi>Tn×Vi, the controller 3 finishes to decide the tool axis attitude.

While the one example of the tool axis attitude 21 is explained here, however the embodiment of the invention is not limited to this construction.

[The Interference Dangerous Zone Deciding Member 23]

Figure 4:
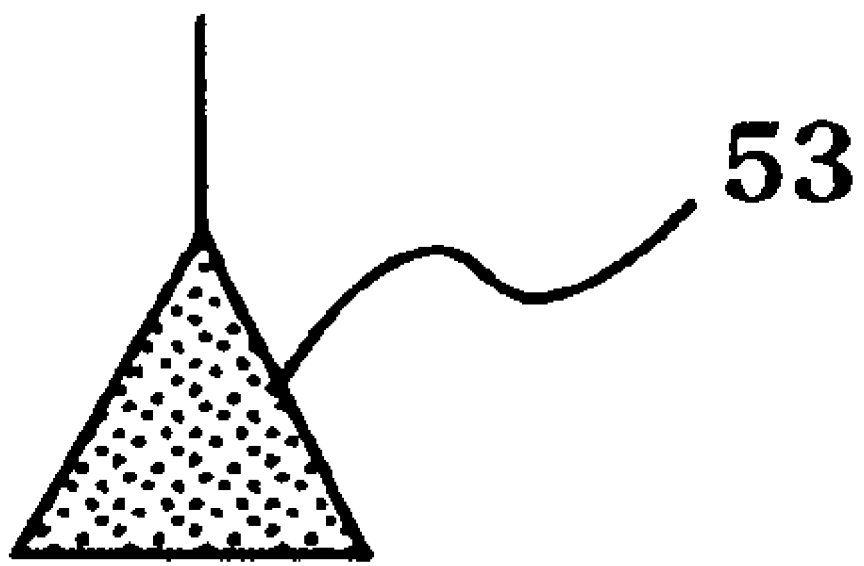
FIG. 4 is a diagram showing one example of an interference template 53.

Referred to FIG. 4 to FIG. 7, the interference dangerous zone deciding member 23 will be explained in detail hereinafter. FIG. 4 is a diagram showing one example of an interference template 53 and is a side view of the interference template 53. The interference template 53 is a profile combining a cone with a needle projecting at a top edge to a normal direction. Of course, the interference template 53 may be constructed by other profile, for example an approximate profile to an upside down reversed predetermined tool holder or tool based on the predetermined tool holder or tool, or the cone may be a pyramid.

Here is explained a size of the interference template 53. First of all, a tooling is pre-determined. The predetermined tooling is a combination of the tool holder and the tool satisfied an equation of L/D=r where L is a projecting amount of tool, D is a transversal length or a diameter of the tool holder, and "r" is a reference value. L/D is an index showing an extent how high or low stiffness of the tool holder and the tool is. The reference value "r" is for example six. The interference template 53 is the upside down profile with the combination of the cone including a range of a profile of the tool holder and the needle having a length coinciding an edge position of the tool with an edge of the needle in relation of the decided predetermined tooling. The needle runs through a center line of the tool. Thereby, a size of the interference template 53 is decided by obtaining values of the tool holder diameter and the index L/D. The value of the tool holder diameter is the maximum value suitable for an actual using tool during the tool holder registered in the tool holder data 42.

Figure 5:
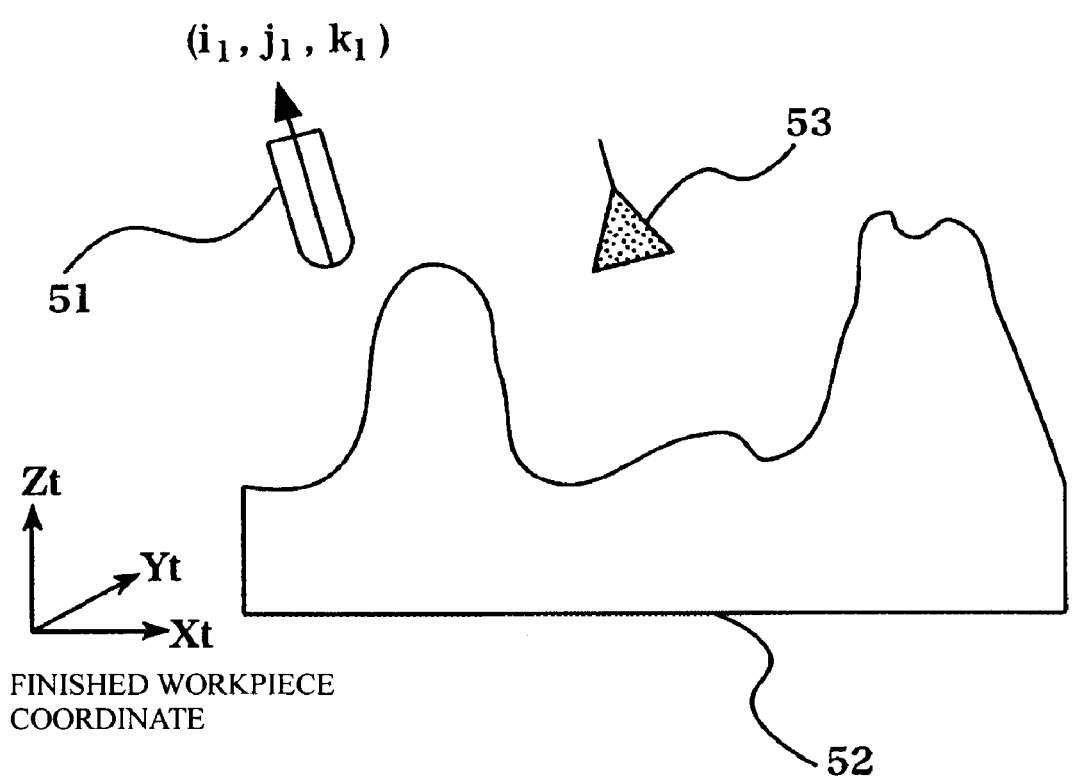
FIG. 5 is a diagram showing the tool 51, the finished workpiece profile 52 and the interference template 53 in a finished workpiece coordinate.

FIG. 5 is a diagram showing the tool 51, the finished workpiece profile 52 and the interference template 53 in a finished workpiece coordinate (Xt, Yt, Zt). As shown in FIG. 5, a direction of the finished workpiece profile 52 is defined by uniqueness theorem in the finished workpiece coordinate (Xt, Yt, Zt). After one tool axis attitude (i1, j1, k1) is selected in Step 1 to Step 11, the direction of the tool 51 is decided. All of the directions of the tool 51, the finished workpiece profile 52 and the interference template 53 are decided by coinciding the tool axis attitude (i1, j1, k1), that is the direction of the tool 51, with the direction of the interference template 53, that is the direction of the needle.

Figure 6:
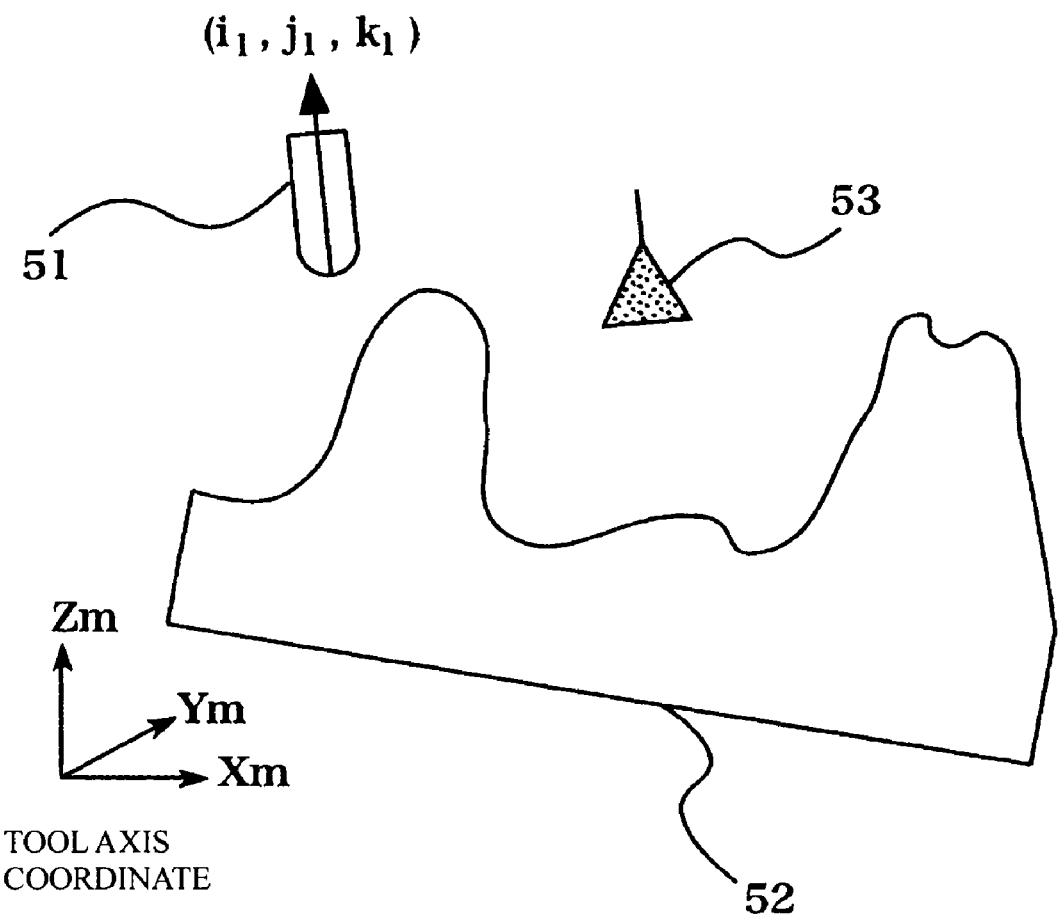
FIG. 6 is a diagram showing the tool 51, the finished workpiece profile 52 and the interference template 53 in a tool axis coordinate.

FIG. 6 is a diagram showing the tool 51, the finished workpiece profile 52 and the interference template 53 in a tool axis coordinate (Xm, Ym, Zm). After all of the directions of the tool 51, the finished workpiece profile 52 and the interference template 53 is relatively transformed by coinciding the one selected tool axis attitude (i1, j1, k1) with a plus direction in Z-axis from a state shown in FIG. 5 to a state shown in FIG. 6, the directions of the tool 51, the direction of the tool 51, the finished workpiece profile 52 and the interference template 53 is decided in the tool axis coordinate (Xm, Ym, Zm).

The transformation from the finished workpiece coordinate to the tool axis coordinate is a specific process where a Z map method is selected as a profile representing method. The Z map method is to divide a X-Y plane to square profiles in a three dimensional space including the representing profile and to define single profile surface value (Z value) in a Z axis every square in order to represent a whole profile of the finished workpiece. There is no need for transforming from the finished workpiece coordinate to the tool axis coordinate where the other profile representing method.

Figure 7:
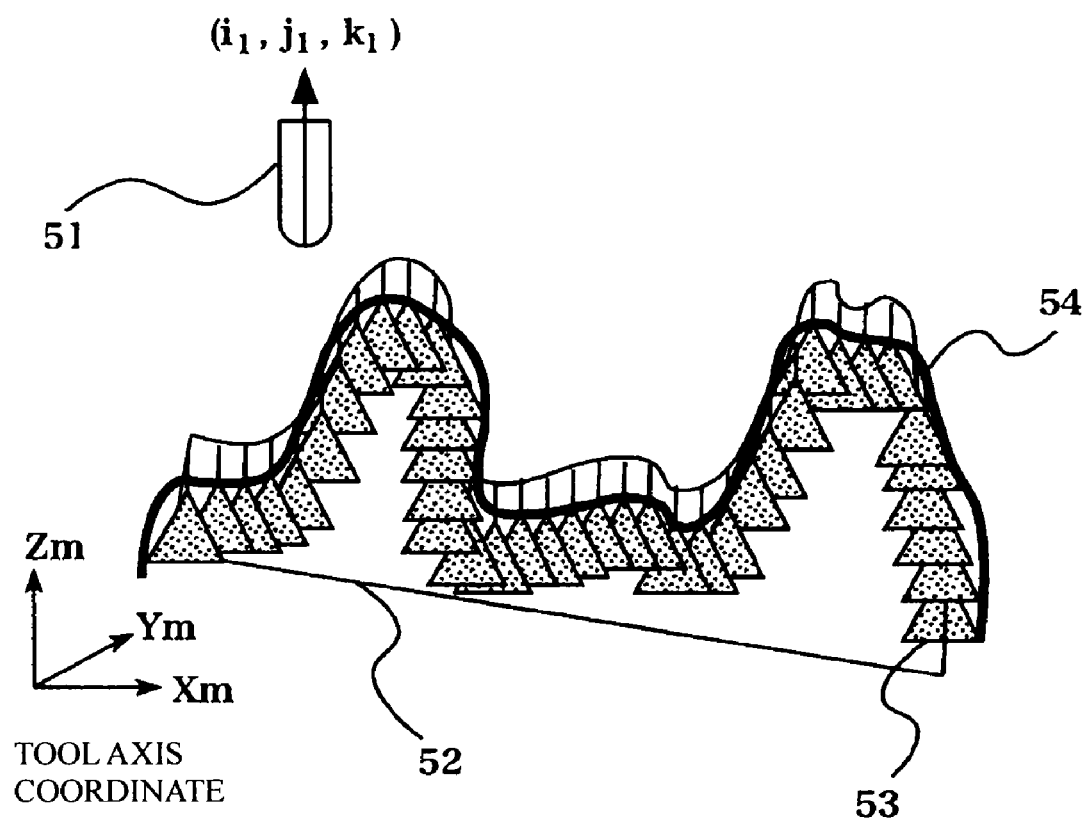
FIG. 7 is an explanatory diagram explaining process of the interference dangerous zone deciding member 23.

FIG. 7 is an explanatory diagram explaining process of the interference dangerous zone deciding member 23. FIG. 7 shows the process of the interference dangerous zone deciding member 23 to decide an interference dangerous zone 54 by the same thinking method of to a reversing offset method against the finished workpiece profile shown in FIG. 6. First of all, the controller 3 moves the interference template 53 in a way that the top edge of the needle of the interference template 53 traces on a line of the surface of the finished workpiece 52, thereby to register trajectory datum of the movement of the interference template 53 in a workpiece memory zone of the RAM. Next, the controller 3 determines as the interference dangerous zone the zone included by the plural cones and registered in the workpiece memory zone to register the decided interference dangerous zone as an interference dangerous zone data 45 in the zone data base 35 of the memory 5. As shown in FIG. 7, an enveloping surface is represented by a wide line for your convenience to show the interference dangerous zone 54 inside the enveloping surface to a minus direction of a Zm axis from a reference of the wide line.

[The Machining Simulation Member 25]

Figure 8:
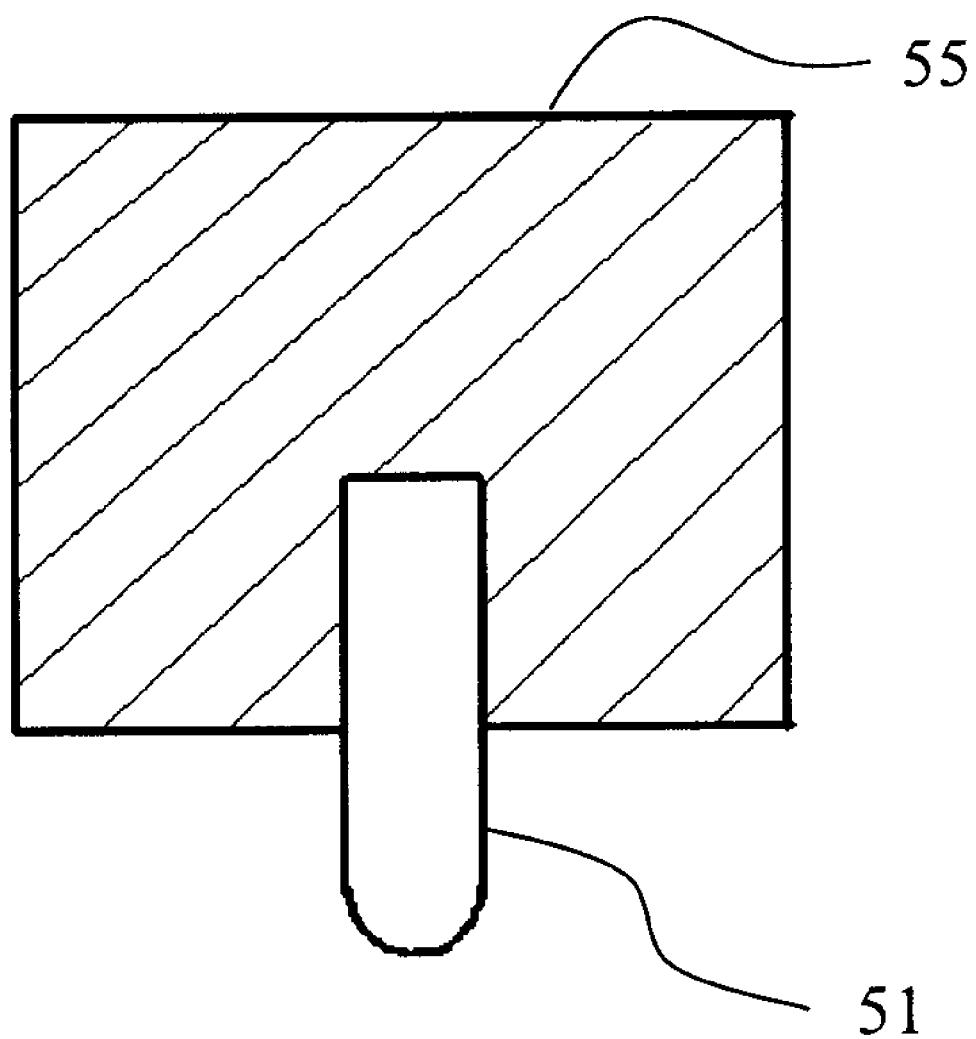
FIG. 8 is a diagram showing one example of a virtual tool holder 55.
Figure 9:
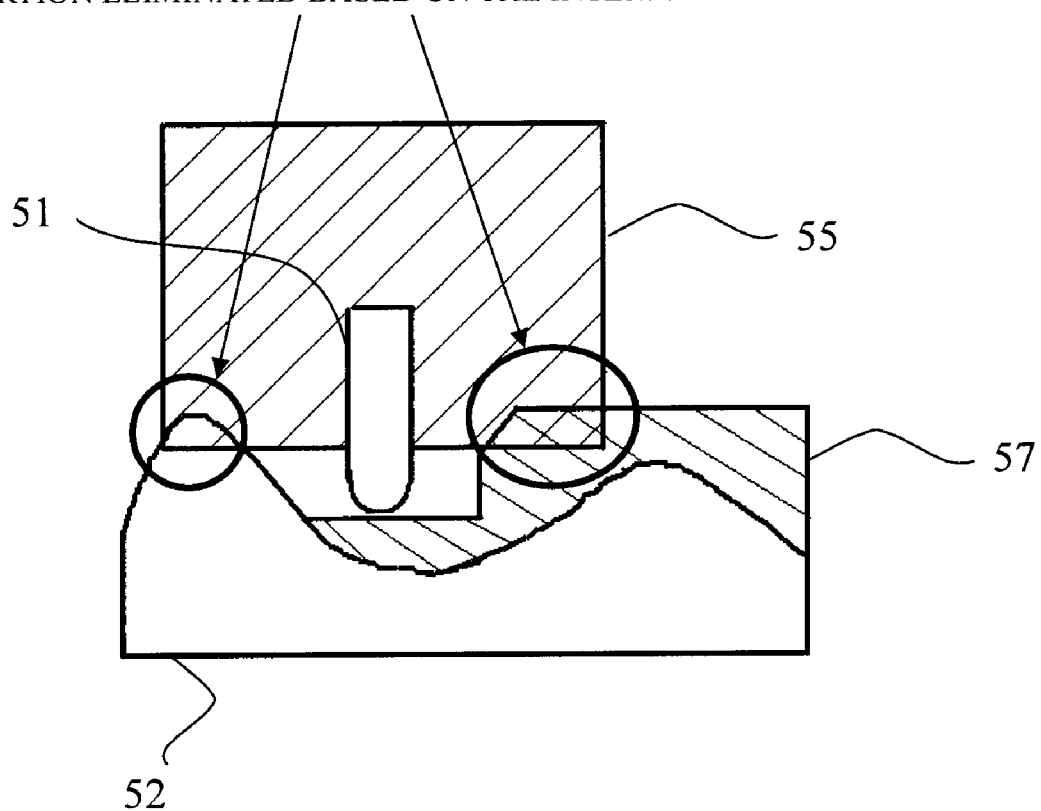
FIG. 9 is an explanatory diagram explaining a portion which should be eliminated because of the interference in the virtual tool holder 55.

Referred to FIG. 8 and FIG. 9, the machining simulation member 25 will be explained in detail hereinafter. FIG. 8 is a diagram showing one example of a virtual tool holder 55. The virtual tool holder 55 shown in FIG. 8 is the tool holder registered in the tooling data base 37 as the virtual tool holder data 47 for the initial value. FIG. 9 is an explanatory diagram explaining a portion, which should be eliminated because of the interference, in the virtual tool holder 55. A workpiece profile 57 shown in FIG. 9 includes in adding to a part of the finished workpiece profile a machined portion shown by an oblique line.

The machining simulation member 25 decides, every decided tool axis attitude in Step 1 to Step 11, a machining zone in a way of avoiding the possible interference dangerous zone that is the zone machined by the one identified tool axis attitude. The machining simulation member 25 sets the virtual tool holder 55 shown in FIG. 8 to the tool 51 and performs the machining simulation for the decided machining zone.

The virtual tool holder 55 shown in FIG. 8 is set to be larger than the tool holder related to a random tool holder 42 registered in the device data base 31. The machining simulation member 25 eliminates the interference portion every time where the virtual tool holder 55 interferes with the workpiece profile 57. The machining simulation member 25 stores in the tooling data base 37 of the memory 5 the remaining portion, which is not eliminated, as the virtual tool holder data 47 relating to a non-interference virtual tool holder 55.

[The Non-Interference Tooling Deciding Member 27]

Figure 10:
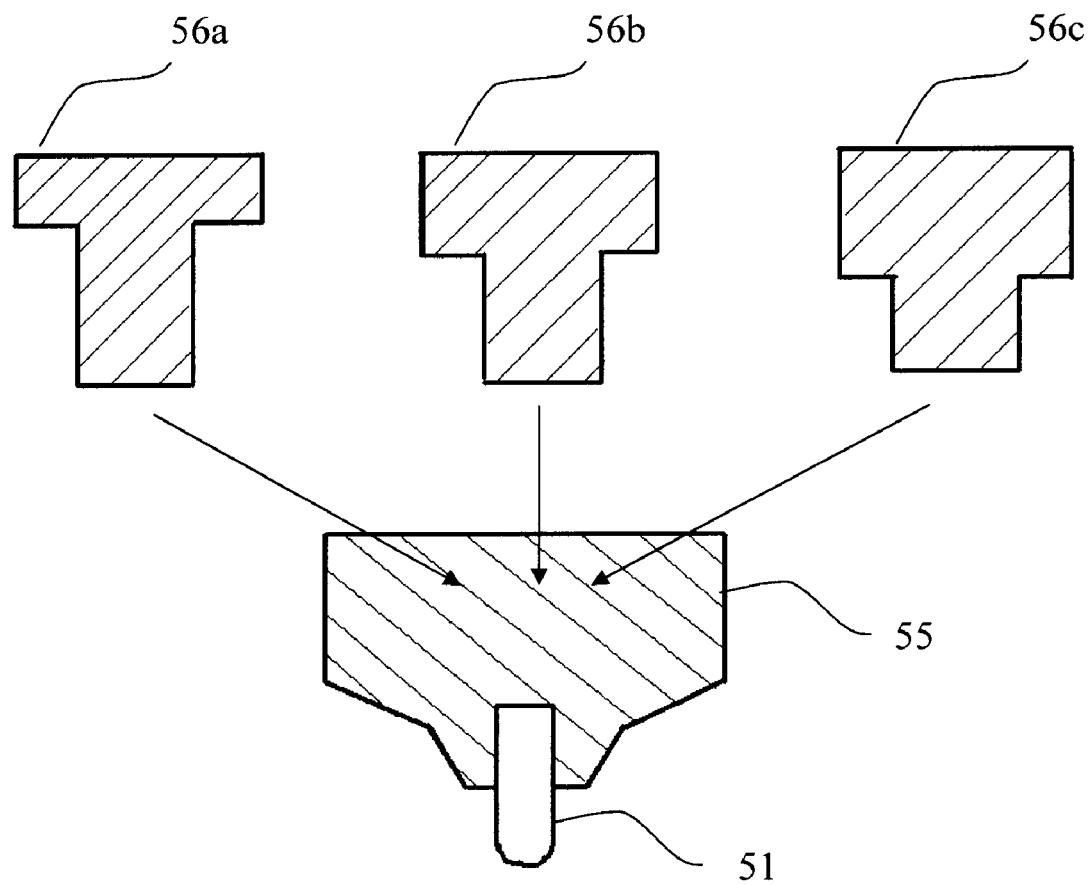
FIG. 10 is a diagram showing a selectable tooling.
Figure 11:
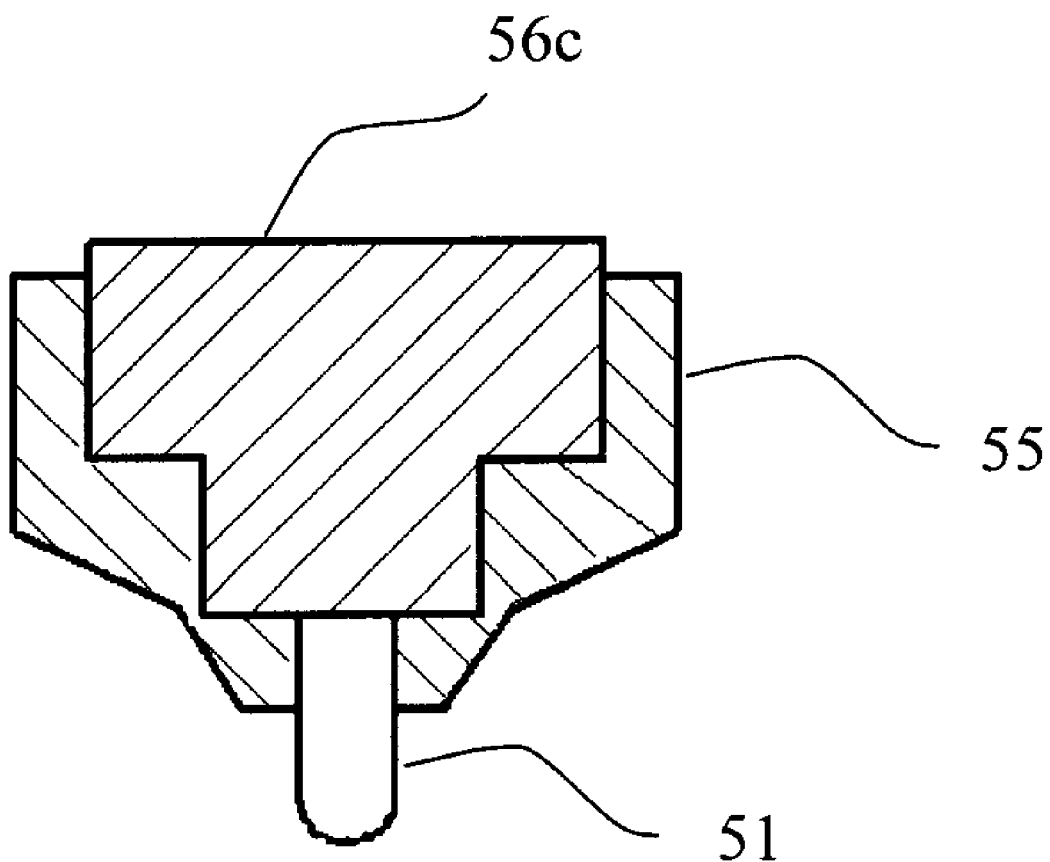
FIG. 11 is a diagram showing a decided tooling.

Referred to FIG. 10 and FIG. 11, the non-interference tooling deciding member 27 will be explained in detail hereinafter. FIG. 10 is a diagram showing a selectable tooling. FIG. 11 is a diagram showing a decided tooling.

The non-interference tooling deciding member 27 selects the tooling included in the range of the profile of the virtual tool holder 55 shown in FIG. 10 and having the highest stiffness from a group of a tool holder 56$a$, a tool holder 56$b$ and a tool holder 56$c$. FIG. 10 shows only the selection of the tool holder, however the fittest tool 51 should be selected in referring to the tool datum registered in the device data base 31.

The non-interference tooling deciding member 27 decides the tooling having the highest stiffness by selecting a combination having the highest bending stiffness when the tool is installed in the tool holder and registers the decided tooling in the tooling data base 37 of the memory 5 as the non-interference tooling data 48. In one example, it is selected the combination of the tool 51 and the tool holder 56$c$ having the highest bending stiffness as shown in FIG. 11. The profile of the virtual tool holder 55 shown in FIG. 10 can not interfere with the workpiece profile 57 because the portions interfering with the workpiece profile 57 are eliminated by the machining simulation member 25.

[The Operation of the Embodiment of the Present Invention]

Figure 12:
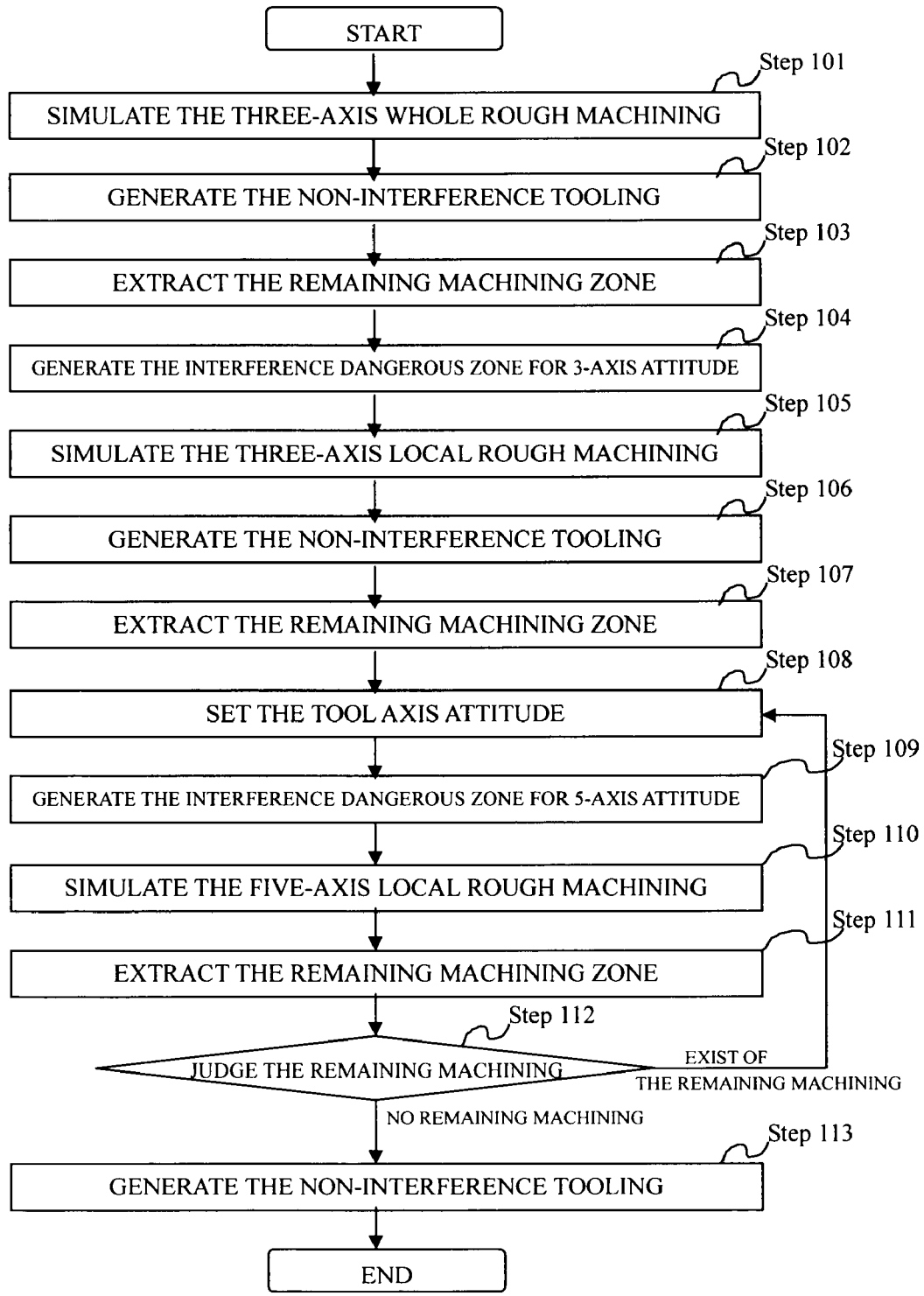
FIG. 12 is a diagram showing a flowchart for the embodiment of the machining parameter optimizing apparatus 1.

The operation of the embodiment of the machining parameter optimizing apparatus 1 according to the present invention will be explained referred to FIG. 12 hereinafter. FIG. 12 is a diagram showing a flowchart for the embodiment of the machining parameter optimizing apparatus 1. The embodiment is the simulation for machining a die and so on in order of three-axis whole rough machining, three-axis local rough machining and five-axis local rough machining.

As shown in FIG. 12, the controller 3 of the machining parameter optimizing apparatus 1 executes the simulation of a three-axis whole rough machining at first in Step 101. The controller 3 decides the tool 51 as a large diameter possible to machine the whole finished workpiece profile 52 without any interference and decides that the tool axis attitude is the Z axis direction, thereby executing the simulation of the whole rough machining in Step 101. Then the controller 3 decides the machining zone and generates the virtual tool holder 55. The controller 3 executes the operation by the machining simulation member 25 in Step 101.

In Step 102, the controller 3 executes to generate the non-interference tooling. The controller 3 generates the tooling with the tool 51 having the large diameter and without any interference in Step 102. The controller 3 executes the process by the non-interference tooling deciding member 27 in Step 102. The tooling generated in Step 102 is for the three-axis whole rough machining.

In Step 103, the controller 3 executes to extract the remaining machining zone. In Step 103, the controller 3 extracts a non-machining zone remained in Step 101. The controller 3 executes the operation by the remaining area extracting member 29 in Step 103.

In Step 104 the controller 3 executes to generate the interference dangerous zone of the three-axis attitude. The controller 3 generates the interference dangerous zone by the interference template 53 in which the tool attitude is the Z axis direction in Step 104. The controller 3 executes the operation by the interference dangerous zone determining member 23 in Step 104.

In Step 105, the controller 3 executes the simulation of the three-axis local machining. In Step 105 while the controller 3 avoids the interference dangerous zone generated in Step 104, the controller 3 decides that the tool 51 is one having a small diameter for the remaining machining zone extracted in Step 103 and also decides that the tool axis attitude is the Z axis direction, thereby executing the simulation of the local rough machining. Then the controller 3 executes to decide the machining zone and generates the virtual tool holder 55. The controller 3 executes the process by the machining simulation member 25 in Step 105.

In Step 106, the controller 3 executes to generate the non-interference tooling. In Step 106, the controller 3 generates the tooling in which the tool has the small diameter and the interference is not occurred on a basis of the virtual tool holder 55 generated in Step 105. The controller 3 executes the process by the non-interference tooling deciding member 27 in Step 106. The tooling generated in Step 102 is for the three-axis local rough machining.

In Step 7, the controller 3 executes to extract the remaining machining zone. The controller 3 extracts in Step 107 the non-machining zone remaining after Step 105. The controller 3 executes the process by the remaining machining zone extracting member 29 in Step 107.

In Step 108, the controller 3 executes to set the tool axis attitude. In Step 108, the controller 3 sets for Step 109 to Step 112 another tool axis attitude different from the previously set tool axis attitude. The controller 3 executes the process by the tool axis attitude determining member 21 in Step 108.

In Step 109, the controller 3 executes to generate the interference dangerous zone for five-axis attitudes. The controller 3 sets in Step 109 the interference template 53 according to the tool axis attitude set in Step 108 and generates the interference dangerous zone. The controller 3 executes the process by the interference dangerous zone deciding member 23 in Step 109.

In Step 110, the controller 3 executes the simulation of the five-axis local rough machining. In Step 110 while the controller 3 avoids the interference dangerous zone generated in Step 109, the controller 3 decides that the tool 51 is one having a small diameter for the remaining area extracted in Step 107, thereby executing the local rough machining simulation according to the tool axis attitude set in Step 108. Then the controller 3 executes to decide the machining zone and generates the virtual tool holder 55. The controller 3 executes the process by the machining simulation member 25 in Step 110.

In Step 111, the controller 3 executes to extract the remaining machining zone. The controller 3 extracts in Step 111 the non-machining zone remaining after Step 110. The controller 3 executes the process by the remaining machining zone extracting member 29 in Step 111.

In Step 112 the controller 3 executes to judge the machining remaining, and repeats from the Step 108 to Step 111 where there exists the remaining machining zone or finishes the process where there is no remaining machining zone.

In Step 113, the controller 3 executes to generate the non-interference tooling. The controller 3 generates in Step 113 the tooling, in which the diameter of tool 51 is small and in which interference is not occurred, based on the virtual tool holder generated finally in Step 110. The controller 3 executes the process by the non-interference tooling deciding member 27 in Step 113. The tooling generated in Step 113 is applied over the process for the five-axis local rough machining. By the one embodiment of the present invention, it is possible to increase a machining efficiency by eliminating a tool changer in the process of the five-axis local rough machining because the one embodiment of the present invention decides one optimized tooling based on the virtual tool holder 55 generated finally in Step 110 after the controller 3 repeats to decide the tool axis attitude, to decide the interference dangerous zone, to generate the virtual tool holder and to extract the remaining machining area from Step 108 to Step 112 until there is no remaining machining zone.

Besides, the controller 3 may execute to decide the tooling every tool axis attitude in the same process of the five-axis local rough machining. In this case, the controller 3 executes to decide the tooling after Step 111 on the basis of the tool axis attitude decided in the Step 108. The one embodiment can machine the workpiece by the optimized tooling for each of the tool axis attitude by the way of deciding the tooling every tool axis attitude.

The machining parameter optimizing apparatus 1 according to the one embodiment of the present invention can decide the tooling having the high stiffness as well as decide the tool axis attitude and the machining zone in each machining process of the three-axis whole rough machining, the three-axis local rough machining and the five-axis local rough machining.

While the invention has been described in detail with reference to the preferred embodiment, it will be apparent to those skilled in the art that the invention is not limited to the present embodiment, and that the invention may be realized in various other embodiments within the scope of the claims.

What is claimed is:

1. A machining parameter optimizing apparatus optimizing a machining parameter relating to at least a tool axis attitude, a machining zone and a tooling, the apparatus including a controller including a processor, the processor executing instructions stored in a memory, and configured to execute:
    a tool axis attitude deciding to decide said one or plural tool axis attitude;
    an interference dangerous zone deciding to decide, as an interference dangerous zone, a zone possible to interfere between a tool or a tool holder and a workpiece during machining by said decided tool axis attitude;
    a virtual tool holder generating to generate a machining simulation based on said interference dangerous zone by said decided tool axis attitude and to decide said machining zone in a way of avoiding said interference dangerous zone to generate said virtual tool holder in which there is no any said interference; and
    a tooling deciding to decide said tooling included in a range of a profile of said virtual tool holder, wherein said tooling is a combination of said tool and tool holder having the highest stiffness.

2. The machining parameter optimizing apparatus according to claim 1, wherein said interference dangerous zone deciding identifies a zone possible to interfere in machining by moving an interference template generated based on said identified tool and tool holder along a profile of a finished workpiece.

3. A machining parameter optimizing apparatus according to claim 2, wherein said interference dangerous zone deciding identifies said zone possible to interfere in a rough machining.

4. The machining parameter optimizing apparatus according to claim 1, wherein said tooling deciding decides said tooling every tool axis attitude decided by said tool axis attitude deciding.

5. The machining parameter optimizing apparatus according to claim 1, the processor further configured to execute:
    a remaining machining zone extracting to generate a workpiece profile machined in accordance with said decided tool axis attitude, said decided machining zone and said decided tooling or a predetermined tooling to extract as a remaining machining zone a difference between said generated workpiece profile and a finished workpiece.

6. The machining parameter optimizing apparatus according to claim 5, wherein said tooling deciding decides said tooling executed over a predetermined process based on said virtual tool holder generated finally by said virtual tool holder generating after repeating processes by said tool axis attitude deciding, said interference dangerous zone deciding, said virtual tool holder generating and said remaining machining zone extracting until said remaining machining zone is zero.

7. A machining parameter optimizing apparatus optimizing a machining parameter relating to at least a tool axis attitude, a machining zone and a tooling, the apparatus including a controller including a processor, the processor executing instructions stored in a memory, and configured to execute:
    a tool axis attitude deciding to decide said one or plural tool axis attitude;
    an interference dangerous zone deciding to decide, as an interference dangerous zone, a zone possible to interfere between a tool or a tool holder and a workpiece during machining every tool axis attitude decided by said tool axis attitude deciding;
    said interference dangerous zone deciding identifies a zone possible to interfere in machining by moving an interference template generated based on said identified tool and tool holder along a profile of a finished workpiece;
    a virtual tool holder generating to generate a machining simulation based on said interference dangerous zone every decided tool axis attitude and to decide said machining zone in a way of avoiding said interference dangerous zone to generate said virtual tool holder in which there is no any said interference;

a tooling deciding to decide said tooling included in a range of a profile of said virtual tool holder, said tooling is a combination of said tool and tool holder having the highest stiffness;

said tooling deciding decides said tooling every tool axis attitude decided by said tool axis attitude deciding; and a remaining machining zone extracting to generate a workpiece profile machined in accordance with said decided tool axis attitude, said decided machining zone and said decided tooling or a predetermined tooling to extract as a remaining machining zone a difference between said generated workpiece profile and said finished workpiece;

said tooling deciding decides said tooling executed over a predetermined process based on said virtual tool holder generated finally by said virtual tool holder generating after repeating processes by said tool axis attitude deciding, said interference dangerous zone deciding, said virtual toll holder generating and said remaining machining zone extracting until said remaining machining zone is zero.

8. A machining parameter optimizing apparatus optimizing a machining parameter relating to at least a tool axis attitude, a machining zone and a tooling, the apparatus including a controller including a processor, the processor executing instructions stored in a memory, and configured to execute:

a tool axis attitude deciding means for deciding said one or plural tool axis attitude;

an interference dangerous zone deciding means for deciding as an interference dangerous zone a zone possible to interfere between a tool or a tool holder and a workpiece during machining every tool axis attitude decided by said tool axis attitude deciding means;

said interference dangerous zone deciding means for identifying a zone possible to interfere in machining by moving an interference template generated based on said identified tool and tool holder along a profile of a finished workpiece;

a virtual tool holder generating means for executing a machining simulation based on said interference dangerous zone every decided tool axis attitude and deciding said machining zone in a way of avoiding said interference dangerous zone to generate said virtual tool holder in which there is no any said interference;

a tooling deciding means for deciding said tooling included in a range of a profile of said virtual tool holder, wherein said tooling is a combination of said tool and tool holder having the highest stiffness;

said tooling deciding means decides said tooling every tool axis attitude decided by said tool axis attitude deciding means; and a remaining machining zone extracting means for generating a workpiece profile machined in accordance with said decided tool axis attitude, said decided machining zone and said decided tooling or a predetermined tooling to extract as a remaining machining zone a difference between said generated workpiece profile and said finished workpiece;

said tooling deciding means decides said tooling executed over a predetermined process based on said virtual tool holder generated finally by said virtual tool holder generating means after repeating processes by said tool axis attitude deciding means, said interference dangerous zone deciding means, said virtual tool holder generating means and said remaining machining zone extracting means until said remaining machining zone is zero.

9. A method for optimizing, by a computer processor, a machining parameter relating to at least a tool axis attitude, a machining zone and a tooling, the method comprising:

a tool axis attitude deciding step of deciding, by the processor, said one or plural tool axis attitude;

an interference dangerous zone deciding step of deciding, by the processor, as an interference dangerous zone a zone possible to interfere between a tool or a tool holder and a workpiece during machining by said decided tool axis attitude;

a virtual tool holder generating step of executing, by the processor, a machining simulation based on said interference dangerous zone by said decided tool axis attitude and deciding said machining zone in a way of avoiding said interference dangerous zone to generate said virtual tool holder in which there is no any said interference; and a tooling deciding step of deciding, by the processor, said tooling included in a range of a profile of said virtual tool holder, said tooling is a combination of said tool and tool holder having the highest stiffness.

10. The method for optimizing a machining parameter according to claim 9, wherein said interference dangerous zone deciding step identifies a zone possible to interfere in machining by moving an interference template generated based on said identified tool and tool holder.

11. The method for optimizing a machining parameter according to claim 9, wherein said tooling deciding step decides said tooling every tool axis attitude decided by said tool axis attitude deciding step.

12. The method for optimizing a machining parameter according to claim 9, further comprising:

a remaining machining zone extracting step of generating, by the processor, a workpiece profile machined in accordance with said decided tool axis attitude, said decided machining zone and said decided tooling or a predetermined tooling to extract as a remaining machining zone a difference between said generated workpiece profile and said finished workpiece.

13. The method for optimizing a machining parameter according to claim 9, wherein said tooling deciding step decides said tooling executed over a predetermined process based on said virtual tool holder generated finally by said virtual tool holder generating step after repeating processes by said tool axis attitude deciding step, said interference dangerous zone deciding step, said virtual tool holder generating step and said remaining machining zone extracting step until said remaining machining zone is zero.

14. A non-transitory computer-readable medium including instructions, which when executed by a computer processor, cause the computer processor to perform the method recited in claim 9.

\* \* \* \* \*